April 5, 1960
W. R. WILSON
2,931,951
ELECTRIC PROTECTIVE EQUIPMENT
Filed Dec. 30, 1958
2 Sheets-Sheet 1
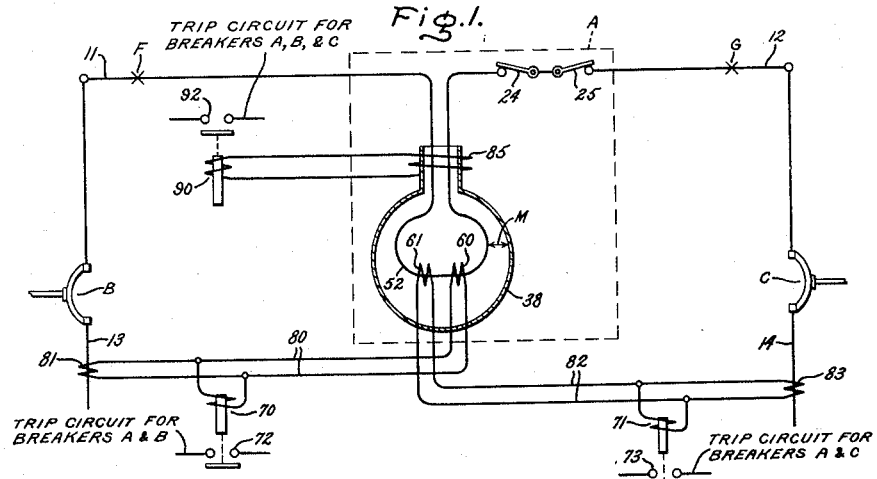
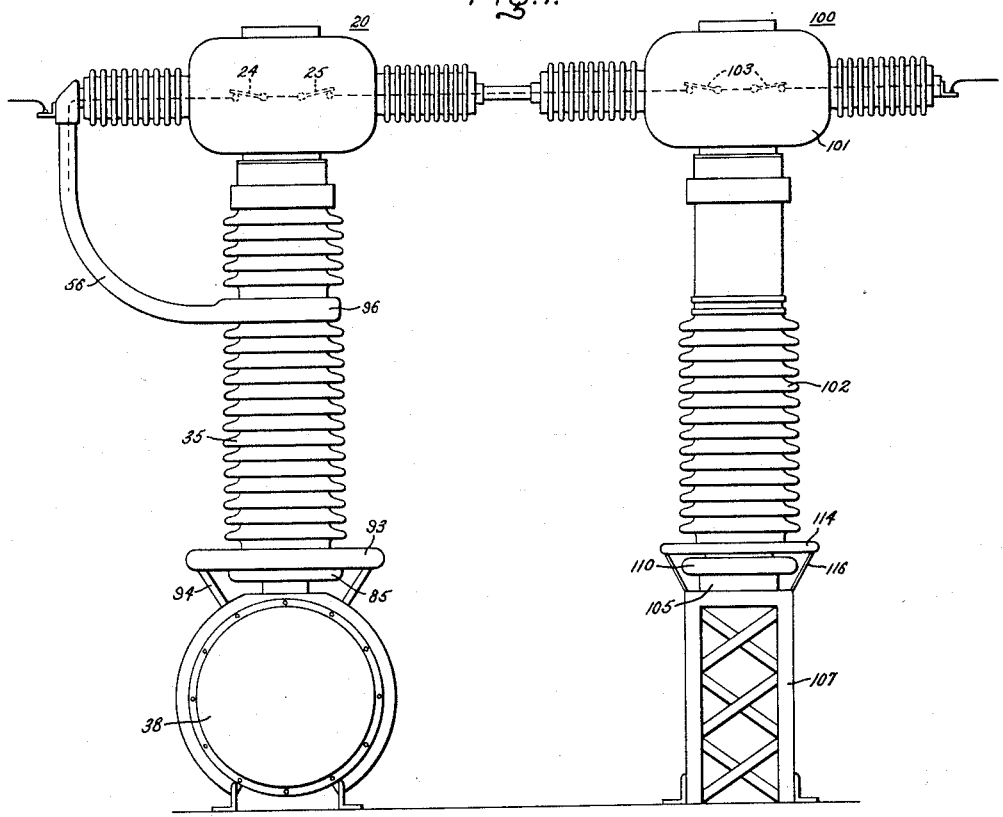
Inventor:
Walter R. Wilson,
by William Friedman
His Attorney.

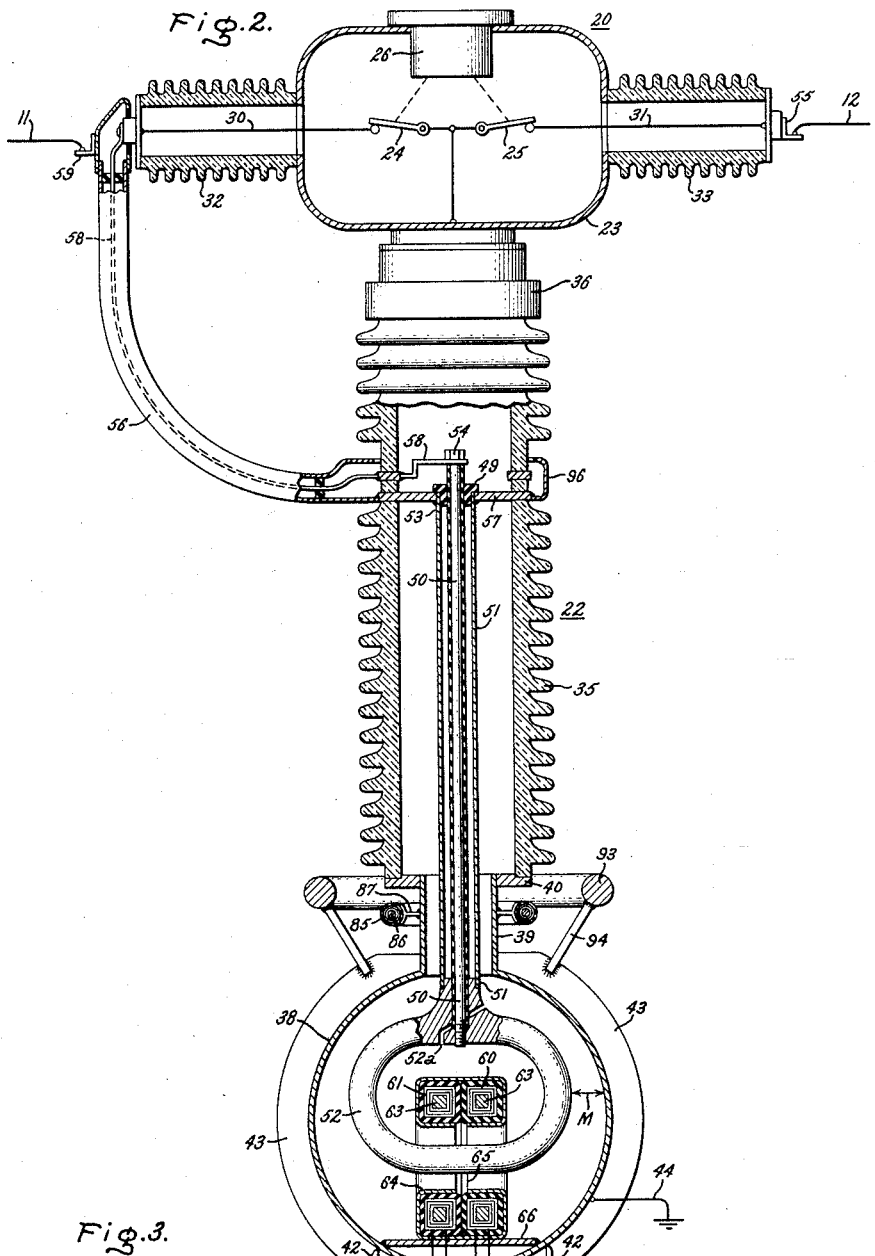

United States Patent Office 2,931,951
Patented Apr. 5, 1960

2,931,951

ELECTRIC PROTECTIVE EQUIPMENT

Walter R. Wilson, Broomall, Pa., assignor to General Electric Company, a corporation of New York Application December 30, 1958, Serial No. 783,926

21 Claims. (Cl. 317—27)

This invention relates to protective equipment for electric power circuits and, more particularly, to a new and improved current transformer arrangement which will provide correct operation of the protective equipment for substantially all fault conditions.

The usual electric power system may be thought of as comprising a number of system portions interconnected by circuit breakers between adjacent portions. These circuit breakers are usually controlled by a protective relay system which must be capable of sensing the occurrence of a fault in any of the system portions and of initiating opening of those particular circuit breakers which are located to effect isolation of the faulted system portion from the remainder of the system. It is a general objective in the art of protective relaying to open only the minimum number of circuit breakers required to effect isolation of the fault so that a maximum amount of the system remains available for continued uninterrupted service.

To this end, the protective relaying system usually comprises a plurality of relays each of which has a zone of operation generally coextensive with a different one of the system portions. Each of these relays can determine when a fault occurs in its own particular zone of operation and can respond by initiating opening of the breakers at opposite terminals of its zone. If a fault were to occur inside one of the circuit breakers, there would be a likelihood that the interrupting ability of this particular breaker would be impaired, and this would mean that this particular breaker might not be capable of isolating the fault from the remainder of the system. It is customary to provide for this contingency by arranging the relay operating zones in such a manner that adjacent operating zones overlap in the region of the circuit breaker. With the circuit breaker located in this zone of overlap, a fault inside the circuit breaker would be a fault in both operating zones and therefore would cause relays individual to each zone to operate, thereby opening the breakers at opposite electrical sides of the faulted breaker.

One conventional manner of establishing the physical boundaries of an operating zone is to locate current transformer windings at the locations one wishes to consider the boundaries of the zone and to connect these windings in a differential protective circuit. A relay suitably connected in such a differential circuit will operate in response to a fault occurring inside this protected zone but will remain inactive if the fault is external to this zone. To obtain the aforementioned overlap, it has been customary to mount the current transformer windings at opposite terminals of the circuit breaker, with the current transformer winding at one terminal defining one end of a first operating zone containing the circuit breaker and the system portion at one side of the breaker, and the current transformer winding at the other terminal defining one end of a second operating zone containing the circuit breaker and, in this case, the system portion at the other side of the breaker. Such an arrangement provides a zone of overlap coextensive with the internal circuit of the breaker. Faults occurring in the internal circuit will be faults in both operating zones and will generally cause relays individual to each zone to operate, thereby opening the breakers at opposite electrical sides of the faulted breaker and thus isolating two system portions from the remainder of the system. Faults occurring external to the circuit breaker will be in only one operating zone and will cause only the relay individual to that particular operating zone to operate, thus effecting isolation of only one system portion from the remainder. The dead tank type circuit breaker, as exemplified by the usual oil circuit breaker, readily lends itself to the above described overlapping arrangement because it has terminal bushings about which the two current transformer windings may be conveniently and economically mounted in electrically overlapping relationship. Some circuit breakers, however, have no such bushings, or for some other reason, do not lend themselves to the use of current transformer windings at opposite terminals. From the standpoint of economy, it is desirable in such breakers to mount the pair of windings in a single insulating housing disposed at one side of the circuit interrupting part of the breaker. This, however, interferes with the ability of the windings to distinguish accurately between faults internal to the breaker and those external to the breaker since the zone of overlap can no longer be coextensive with the internal circuit of the breaker. This weakness has discouraged widespread adoption of most prior arrangements employing current transformer windings at only one side of the circuit interrupting component.

It is therefore an object of my invention to provide protective apparatus which is capable of accurately distinguishing between faults internal to a circuit breaker and those external thereto, even though the usual current transformer windings are mounted in a single housing at one electrical side of the circuit interrupting component of the breaker.

An additional object is to provide protective apparatus capable of attaining the objects of the immediately-preceding paragraph and also capable of accurately distinguishing between external faults at one side of the breaker and external faults at the other side.

Another object is to provide protective equipment of the above character which is highly resistant to having its operation impaired by careless connections being made to the usual grounded tank of the breaker.

Some circuit breaker users might wish to relay external flashovers in the immediate vicinity of a breaker in the same manner as internal faults, on the assumption that such external flashovers could possibly impair the interrupting ability of the breaker.

To accommodate such users, it is another object of my invention to provide protective apparatus relying upon current transformer windings in a single housing at one electrical side of a circuit interrupting component which is capable of relaying external faults in the immediate vicinity of the breaker in the same manner as internal faults are usually treated.

In carrying out my invention in one form, I provide a circuit breaker assembly for interconnecting power circuits disposed at opposite electrical sides of the assembly. The circuit breaker assembly comprises a circuit interrupter comprising a housing and separable contacts disposed therein. The circuit breaker assembly further comprises an enclosure made up of a hollow insulating column, on which said housing is supported, and a tank disposed adjacent the lower end of the column. A current transformer primary conductor is conducted in series with the contacts and comprises a pair of series-connected arms forming a loop. One of said arms extends through a portion of the column into the tank and the other of the arms extends from the tank back through a portion of the column. First and second current transformer secondary windings are disposed within the tank and are magnetically coupled to the primary conductor. These secondary windings are respectively used to define one of the boundaries of a pair of differential protective zones located at opposite electrical sides of the circuit breaker assembly. Disposed externally to said enclosure is a third current transformer secondary winding having a magnetic circuit also disposed externally to said enclosure and mounted about both arms of the primary conductor so that said third winding is normally deenergized. This third winding is arranged to initiate deenergization of the power circuits at both electrical sides of the circuit breaker assembly in response to energization of the third winding. Substantially all faults occurring within the enclosure are forced to follow a path to ground that is so located that the fault produces a net flow of current in the region disposed internally of the magnetic circuit of said third winding thereby effecting energization of said third winding. Means is provided for forcing all ground faults occurring externally to the circuit breaker assembly in the region of the insulating column to consistently follow a breakdown path to ground which has a predetermined electrical location relative to the magnetic circuit of the third winding.

In one modification of my invention, the latter breakdown path is disposed externally to the magnetic circuit of the third winding, and, as a result, fault currents following this breakdown path will not energize the third winding, thus causing such faults to be relayed differently from faults occurring within the enclosure.

In another modification of my invention, the latter breakdown path is located internally of the magnetic circuit of the third winding. Fault currents following this path will energize the third winding, thereby causing such faults to be relayed in the same manner as faults occurring within the enclosure.

For a better understanding of my invention reference may be had to the following specification taken in conjunction with the accompanying drawings, wherein:

Fig. 1 is a schematic illustration of an electric power system containing a circuit breaker assembly constructed in accordance with the present invention.

Fig. 2 is a side elevational view partly in section and partly schematic showing one form of circuit breaker assembly for use in the power system of Fig. 1.

Fig. 3 is a slightly modified form of the circuit breaker assembly shown in Fig. 2.

Fig. 4 shows another modified form of the circuit breaker assembly of Fig. 2.

Referring now to the schematic illustration of Fig. 1, there is shown, by means of a dotted line block, a circuit breaker assembly A which, for illustrative purposes, is used as a bus-tie breaker which electrically interconnects a pair of bus sections 11 and 12. In the usual electric power system, a plurality of electric circuits, which may be either feeder or distribution circuits for respectively supplying electrical energy to or from the bus, are connected to each of the bus sections, but for simplicity, I have shown only a single circuit 13 connected to bus section 11 and a single circuit 14 connected to bus section 12. Circuit 13 is interconnected to bus section 11 through a remote circuit breaker B, and circuit 14 is interconnected to the bus section 12 through a remote circuit breaker C. For the purposes of this description, these remote circuit breakers may be of a conventional construction and, hence, are shown in schematic form only. It is desirable to isolate, or deenergize, only the faulty portion of the electrical power system upon the occurrence of a fault condition in order to permit uninterrupted service to be maintained over the remainder of the system. To this end, if a fault should occur in an external portion of the circuit extending between the breakers, only the breakers at the terminals of the faulted external circuit portion should open. For example, should a fault occur at F, it would be necessary to open only breakers A and B, whereas breaker C should desirably remain operatively connected to its bus section. Thus, circuit 14, if a feeder circuit, could continue to supply power through bus section 12 to any other circuit (not shown) suitably connected to bus section 12. Such other circuit would ordinarily be connected to the bus section 12 through a circuit breaker (not shown) controlled by a suitable current transformer winding connected into the hereinafter-described protective circuit 82 in a conventional manner, such as is disclosed in U.S. Patent No. 2,804,576, Coggeshall et al., assigned to the assignee of the present invention. In a corresponding manner, if a fault should occur at G instead of F, it would be necessary to open only breakers A and C, whereas breaker B should remain operatively connected to its bus section 11 whereby to permit this bus section to remain energized.

Since the faults F and G are external to the breaker, it will be apparent that there is little or no likelihood of their impairing the interrupting ability of the breaker. However, should a fault occur internally of the circuit breaker A, there is a likelihood that the interrupting ability of the breaker A would be impaired, and possibly to such an extent that it would be unable to interrupt the current flowing into the fault. Assuming that the interrupting ability of the breaker A is so impaired, it would be necessary to open the circuit breakers B and C connected to both sides of the breaker A in order to clear and isolate the fault. Thus, it will be apparent that in order to provide the desired selectivity in operating the circuit breakers, it is important that the protective system be capable of distinguishing between faults internal to a circuit breaker and those external thereto and be capable of further distinguishing between those external faults at one side of the breaker and those external faults at the other side. Features of the protective equipment which provide this desired selectivity of operation will become apparent as the description proceeds.

Although I have chosen to distinguish between external and internal faults in the above discussion, this line of distinction has been chosen primarily to simplify the discussion, and, secondarily, because in most cases this distinction should govern the desired manner of relay operation. The secondary reason is based upon the fact that, in most circuit breaker designs, faults internal to the circuit breaker are likely to impair the interrupting ability of the circuit breaker, whereas faults external to the circuit breaker are highly unlikely to impair the interrupting ability of the breaker.

Some circuit breaker users, however, might wish to take a conservative approach with respect to the relaying of external faults in the immediate region of the breaker and to treat such faults as faults likely to impair the interrupting ability of the breaker. In protective equipment designed for such users, these particular external faults should be relayed in the same manner as internal faults, as is illustrated, for example, in the embodiment of my invention shown in Fig. 4 (soon to be described). Accordingly, in its broader aspects, the invention is not limited to protective equipment which distinguishes only between internal and external faults.

As shown in Fig. 2, the bus tie breaker A comprises a circuit interrupting component 20 supported atop an enclosure 22. The details of the circuit interrupter 20 form no part of the present invention and may be of any suitable conventional form, such as shown and claimed, for example, in U.S. Patent No. 2,783,338—Beatty, assigned to the assignee of the present invention. The interrupter of this Beatty patent has been depicted in schematic form in Fig. 2, where it is shown as comprising a metallic housing 23 filled with pressurized air. Mounted within the housing are a pair of series-connected, simultaneously-operable interrupting contacts 24 and 25. The pairs of contacts 24 and 25 are operated by means of a pneumatically-controlled operating mechanism 26 disposed within the housing. The junction between the two pairs of contacts is preferably electrically connected to the housing 23 so that the housing is at line potential when the contacts are closed and is at preferably a mid-potential when the contacts are open.

For supporting the outer contact of each pair of contacts, a pair of rigid conductors shown schematically at 30 and 31 projecting through opposite ends of the metallic housing 23 are provided. These conductors 30 and 31 are respectively enclosed at their outer ends by porcelain cylinders 32 and 33, which also serve to support the conductors. These porcelain cylinders are, in turn, suitably supported upon the metallic housing 23.

The enclosure 22 that supports the circuit interrupter 20 comprises a tubular porcelain column 35 provided with suitable fastening structure 36 at its top for rigidly securing the housing 23 to the top of the porcelain column 35. At the lower end of the porcelain column 35 a metallic tank 38 is provided. The upper portion of this metallic tank 38 comprises a tubular throat 39 which is suitably fastened to an annular plate 40 that, in turn, is bonded to the porcelain column 35. Together the porcelain column 35 and the tank 38 form an enclosure 22 that is rendered gas-tight by suitable seals and gaskets provided at all of its joints. It is to be understood that the space within this enclosure 22 is preferably isolated from the pressurized gas within the interrupting housing 23.

One of the functions of the enclosure 22 is to support the circuit interrupter 20 on a base 41. To this end, a pair of L-shaped legs 42 are suitably secured to the tank 38 near its bottom and are, in turn, bolted or otherwise secured to the base 41. The tank 38 thus supports the column 35 which, in turn, supports the interrupter 20. To impart added rigidity to the tank walls in order to aid them in their supporting function, suitable reinforcing braces 43 are welded to the opposite walls. The tank 38 is solidly connected to ground by a connection 44 provided at a suitable location below the throat 39 of the tank. The porcelain column 35 provides for electrical isolation between the high voltage parts of the breaker and the grounded tank 38.

A second function of the enclosure 22 is to serve as a housing for the current transformer windings of the circuit breaker assembly. To this end, the enclosure 22 is filled with an insulating fluid, preferably a high dielectric strength gas such as sulfur hexafluoride, in which the various components of the current transformer are disposed. The primary conductor of the current transformer is of a loop-shaped form and comprises a pair of coaxially-disposed conductors, or arms, 50 and 51 extending through the porcelain column 35 into the tank 38 where their lower ends are electrically joined by a generally toroidal shaped conducting element 52. More specifically, the conductive arm 50 comprises a rigid stud extending through the insulating column 35 into the tank 38, and the conductive arm 51 comprises a rigid tube surrounding the other conductive arm 50 and locally insulated therefrom by means including an insulating spacer 49. The toroidal shaped conductor 52 is provided with a gap 52a to render it noncontinuous and has its ends on opposite sides of the gap locally insulated from each other and electrically joined to the lower ends of the conductors 50 and 51, respectively. The end of the toroid 52 that is connected to the conductor 51 is locally insulated from the conductor 50.

The upper end 53 of the tubular conductor 51 may be thought of as the line terminal for the current transformer primary, and the upper end 54 for the stud 50 may be thought of as the circuit interrupter terminal of the current transformer primary. The line terminal 53 of the current transformer is electrically connected to a power line corresponding to the line 11 of Fig. 1 by means of a tubular conductor 56. This tubular conductor 56 is locally insulated from the stud 30 of the circuit interrupter and is connected to the stud 30 only through the primary winding 51, 52, 50 of the current transformer. The tubular conductor 56 extends from the outer end of the porcelain bushing 32 to the insulating column 35 in the region of the current transformer terminals. The power line 11 is electrically connected to this tubular conductor 56 at a point 59 near the end of bushing 32, and the line terminal 53 of the current transformer is electrically connected to the tubular conductor 56 in the region of the column 35. The electrical connection between the tubular conductor 56 and the line terminal 53 is preferably provided by means of a conductive disc 57 extending across the column 35 and suitably electrically connected to the tube 56 and the line terminal 53. This disc 57 also serves to support physically the primary conductor 51, 52, 50. The other terminal 54 of the current transformer is connected to the stud 30 of the circuit interrupter by means of a length of conductor 58 extending within the tube 56. This length of conductor 58 is locally insulated from the tube 56, and the tube 56 is locally insulated from the stud 30. As a result, the power circuit through the circuit breaker assembly extends from the power line 11, through the tubular conductor 56, the current transformer primary conductor 51, 52, 50, the length of conductor 58, and thence through the circuit interrupter via the conductive parts 30, 24, 25, and 31 to the terminal 55 connected to the power line 12. When I refer hereinafter to the internal circuit of the circuit breaker assembly, I am referring to that length of circuit which extends from line terminal structure 53, 57 of the current transformer assembly to line terminal 55 of the circuit interrupter. Any faults occurring from this length of circuit are considered to be internal faults, and any faults occurring outside of this length of circuit are considered to be external faults.

I prefer to treat any internal fault as a fault that is likely to impair the interrupting ability of the breaker A and, hence, referring to Fig. 1, as one requiring opening of the breakers B and C in order to effect isolation of the fault. Any external fault, I prefer to treat as one which is unlikely to impair the interrupting ability of the breaker and, hence, as one requiring opening of only the breakers at opposite terminals of the fault. It is to be understood, however, that in the embodiment of Fig. 4 I treat certain of these external faults in the same manner as an internal fault.

Referring now in greater detail to the current transformer assembly, the secondary windings of this assembly are shown at 60 and 61 disposed within the tank 38. Each of these windings is wound about its own annular magnetic core 63 encompassing the primary conductor 52. The turns of each of these windings are insulated from each other and from the core in a conventional manner. Preferably these windings are each enclosed by a suitable grounded metallic housing 64 of a smooth configuration which serves to shield electrostatically the enclosed winding by preventing concentrations of electric stress adjacent the irregular surfaces thereof. The housing 64 is provided with a suitable discontinuity 65 to serve the conventional function of preventing the housing from acting as a short circuited turn. Sufficient space is provided between the primary conductor 52 and the housing 64 to provide the required level of dielectric strength. The secondary windings 60 and 61 are physically supported on the tank 38 by means of a suitable base plate 66 secured to the bottom of the tank. The leads from the windings 60 and 61 are brought out of the tank 38 through suitably sealed and insulated openings (not shown) provided in the bottom of the tank 38.

In order to protect the electrical system shown in Fig. 1, differential relays 70 and 71 are provided for selectively or collectively controlling the tripping of the circuit breakers A, B and C. For this purpose, differential relay 70 includes normally-open contacts 72 which, when closed, establish a tripping circuit for circuit breakers A and B. Similarly, differential relay 71 includes normally-open contacts 73 which, when closed, establish a tripping circuit for circuit breakers A and C. To those skilled in the art, it will be obvious that each of the circuit breakers controlled by a particular tripping circuit may have an electromagnetically-controlled latch which is released to effect breaker opening in response to current flow through this particular tripping circuit. Accordingly, for the purposes of simplifying this description, these conventional details of the tripping circuits have been omitted.

Energization and operation of the relay 70 is effected from a differential protective circuit 80 including the current transformer secondary winding 60 of the breaker A and the current transformer secondary winding 81 of the breaker B. Each of these secondary windings 60 and 81 is energized in accordance with the value of current flowing in the portion of the primary conductor about which each secondary winding is disposed. As is well known in the art, the secondary windings are connected in such a manner that when these primary current values the vectorially equal, current merely circulates between the windings 60 and 81 of the protective circuit 80, as a result of which the coil of relay 70 receives no effective current and remains deenergized. However, if these primary current values become unequal by a vector difference exceeding a predetermined amount, sufficient current will flow through the coil of relay 70 to operate the relay, thereby to close its contacts 72 and establish a trip circuit for breakers A and B. This equal primary current condition will exist so long as no fault is present in the zone of the power circuit extending between windings 80 and 81. However, should a fault, such as at F, occur in this zone, the current flowing into the zone through one of the primary conductor portions would no longer be vectorially equal to the current flowing out of the zone through the other primary conductor portion. The resulting vector difference would produce a current flow in the differential protective circuit 80 which would be such as to operate the differential relay 70 so as to effect tripping of breakers A and B. Thus, the differential relay 70 will operate in response to any fault occurring within the protected zone of the power circuit extending between the windings 60 and 81. Differential protective circuits of this general kind are well known, and may include either a direct connection between the current transformer windings, as is shown, or may alternatively include pilot wires or some other conventional signalling channel interconnecting the windings.

Similarly, energization of the other differential relay 71 is effected from a differential protective circuit 82 including the current transformer windings 83 and 61. The winding of relay 71 is connected in its protective circuit in the same manner as described with respect to relay 70, so that should a fault occur in the protected zone of the power circuit extending between windings 83 and 61, such as at G, the relay 71 would operate to close and thereby trip breakers A and C.

From this description of the operation of the differential protective circuits 80 and 82, it will be apparent that there are two protected zones in the power circuit, one zone extending between winding 81 and 60 and the other zone extending between winding 83 and 61. From this it will be apparent that these two protected zones "overlap," that is, one zone extends into the other zone, and the portion of the power circuit extending between the windings 60 and 61 is therefore common to both circuits. This common zone is known as the zone of overlap. Any fault occurring within this overlap zone will energize both relays 70 and 71, whereas a fault in a single one of the protected zone will energize only a single one of the relays. Thus, it will be apparent that an overlapping protective system can distinguish between faults occurring in the zone of overlap and those occurring outside of this zone. As previously pointed out, it can further distinguish between faults occurring on one side of the zone of overlap and faults occurring on the other side thereof.

Since it is most desirable for the differential protective equipment to distinguish between faults internal to the circuit breaker and those external thereto, it will be apparent that if windings 60 and 61 could be mounted at opposite terminals of the breaker, the zone of overlap would be co-extensive with the internal circuit of the breaker, and accordingly such an overlapping system could generally distinguish between internal and external faults. Certain types of breakers, such as the dead tank type of breaker, lend themselves to mounting the current transformer windings at opposite terminals and thus approach the ideal condition. However, it certain breaker designs, such as the one shown, for example, in Fig. 2, the terminal structures do not readily lend themselves to the mounting of current transformer windings. With the type of breaker shown in Fig. 2, it is most economical that the current transformer windings be mounted within a single insulating housing disposed at one side only of the breaker. In such an arrangement, it is apparent that the zone of overlap can extend over only a minor part of the internal circuit of the breaker, and hence, unless certain modifications are made, inadequate or incorrect operation of the protective system will take place upon the occurrence of faults in the internal circuit of the breaker located outside of the zone of overlap.

To illustrate this latter point, let it be assumed that a fault such as indicated at M occurs within the tank 38. This fault is outside of the zone of overlap between the two windings 60 and 61 and is located solely in the protected zone extending between winding 61 and 83. As a result, the differential protective circuit 80 would be unaffected by the fault M and only the differential protective circuit 82 would be affected. The relay 71 of this protective circuit 82 would operate to initiate opening of the breakers A and C, but this would not isolate the fault M, since the fault location is actually between the breakers A and B. To be assured of isolation of the fault, it would be necessary to open both the breakers B and C in addition to A. The breaker A might possibly be capable of isolating the fault from the power circuit 12, 14, but since there is a likelihood that the internal fault will have impaired the interrupting ability of breaker A, the breaker C should also be opened.

To render the protective equipment capable of accurately distinguishing between external and internal faults so that it is able to handle faults such as M, I provide a third current transformer winding 85 encircling both conductors, or arms, 50 and 51 of the current transformer primary winding. As shown in Fig. 2, this third winding 85 is disposed externally of the enclosure 22 in the region of the throat 39 of the tank 38 and is supported by suitable means 87 projecting outwardly from the throat 39. Preferably, this third winding 85 is wound about an annular magnetic core 86 encircling both the throat portion 39 of tank and the two arms 50 and 51 of the primary winding. The turns of the winding 85 are insulated from each other and from the core 86 and the support 87 in a conventional manner. In certain portions of the present application, the core 86 is referred to as the magnetic circuit of the winding 85.

The coil of a relay 90 is connected across the terminals of this winding 85 so that that the relay coil can be energized from the winding 85. When a net current exceeding a predetermined amount flows through the region encompassed by the magnetic circuit, or core, 86, sufficient current is induced in the current transformer winding 85 to effect operation of the relay 90. Operation of the relay 90 closes a set of contacts 92 to complete a suitable trip circuit for the breakers A, B, and C.

So long as the primary circuit 50, 51, 52 of the current transformer assembly is sound, the winding 85 will not be effectively energized inasmuch as no net current is flowing in a path encompassed by its core 86. In this regard, any current entering the core region through one of the conductors, say 50, is effectively cancelled out by current leaving the core region through the other conductor 51. However, should the primary conductor 50, 51, 52 develop a fault to ground, say within the tank 38, the currents entering and leaving the region of the core 86 would no longer cancel out each other, and thus the winding 85 would be effectively energized. This would cause operation of the relay 90, which, in turn, would trip the circuit breakers A, B, and C, thus effectively isolating the fault in the desired manner. It will be apparent that for any fault to ground occurring within the tank 38, irrespective of its particular location, the windings 85 will be energized to effect tripping of the breakers A, B, and C, as is desired.

In addition to being able to detect a fault occurring from the primary conductor 51, 52, 50, within the tank 38, the current transformer winding is able to detect any faults which might occur to ground from the conductors 50 and 51 within the porcelain column 35. Whether such faults followed a path to ground via the internal surface of the porcelain column 35 or through the gaseous insulator directly to the throat 39 of the metallic tank 38, the path would still be disposed internally of the core of the third current transformer winding 85. As a result, there would be net current flowing internally of the current transformer winding 85 and such current would energize the winding 85 causing it to produce operation of the relay 90 and resultant opening of the breakers A, B, and C, all as desired.

To insure that substantially all faults to ground occurring internally to the current transformer assembly follow a path disposed internally of the third current transformer winding 85, the tank 38 is connected to ground only at points beneath the current transformer winding 85. Thus, there is no significant likelihood of internal fault currents bypassing the third current transformer winding 85. Conceivably the winding 85 could be bypassed by fault current resulting from a fault puncturing the porcelain column 35, but the possibility of such a puncture is so remote as to be essentially negligible.

Since faults internal to enclosure 22 are detected by the third winding 85 and not by relying upon an overlap zone, it will be apparent that the windings 60 and 61 need not be in overlapping relationship. The disclosed arrangement will operate in the above-described manner even if the differential protective zones do not overlap.

It is highly unlikely that the internal circuit of the circuit breaker assembly will develop faults to ground at any location other than in the current transformer assembly. Thus, since my disclosed arrangement is able to handle correctly all faults occurring internally of the current transformer assembly, as has been described hereinabove, it is therefore capable of correctly handling substantially all ground faults which are likely to develop in the entire internal circuit of the circuit breaker assembly.

With regard to minimizing the possibility of faults occurring internally to the circuit breaker assembly in locations outside of the current transformer assembly, it is to be noted that the length of conductor 58 which interconnects the circuit interrupter terminal 54 of the current transformer and the outer end of stud 30 of the circuit interrupter is disposed internally of the conductive tube 56 and is locally insulated therefrom. Since the tube 56 is at substantially the same potential as the conductor 58, the tube 56 acts to shield the conductor 58 from the possibility of a fault to ground. Any faults occurring from the structure 56, 58 would be from the tube 56 rather than the conductor 58. There is also little or no likelihood of a fault occurring between the tube 56 and the conductor 58 inasmuch as these parts are at substantially the same potential and are locally insulated from each other.

The importance of minimizing the possibility of the occurrence of a fault from the conductor 58 will be apparent when it is recognized that such a fault would appear to the protective equipment to be in the operating zone at the right hand side of the breaker A inasmuch as it is located in the portion of a power circuit extending between the current transformer windings 61 and 83. This, however, would be an erroneous interpretation of the location of the fault since it is actually in the portion of the power circuit extending from the left hand side of the interrupting contacts of breaker A. Thus, to isolate such a fault it would be necessary for at least the breaker B to open along with the breaker A. Little could be accomplished by opening the breaker C instead of the breaker B. Thus, by substantially precluding faults from the conductor 58, the possibility of such erroneous operation is effectively minimized.

Along these same general lines, the tubular outer arm 51 of the current transformer primary acts to minimize the possibility of a fault occurring within the column 35 from the arm 50 of the primary conductor to ground. This could conceivably be a rather difficult type of fault to relay since the inner arm is located in the relay operating zone extending to the right of the circuit breaker assembly, but any fault therefrom should be cleared by opening at least the breakers to the left of the circuit breaker assembly.

Faults occurring externally to the circuit breaker assembly, even those occurring in the immediate region of the assembly, I prefer to treat as faults unlikely to impair the interrupting ability of the breaker. For example, a fault from the tube 56 to ground or a fault from either of the line terminals 55 or 59 to ground, are faults unlikely to impair the interrupting ability of the breaker, and such faults I prefer to isolate by opening only the breakers at the terminals of the faulted section. More specifically, a fault from the tube 56 or from the terminal 59 to ground, I prefer to isolate by opening only the breakers A and B, and a fault from terminal 55 to ground I prefer to isolate by opening only the breakers A and C.

To insure that such faults are relayed in this preferred manner, I provide a shield, preferably in the form of a grading ring 93, which generally encompasses the current transformer winding 85 and is electrically interposed between the grounded components of the assembly (including the winding 85) and substantially all of the high voltage parts of the assembly that are susceptible to external faults. This shield 93 is connected to ground only by conductive straps 94 disposed externally to the core, or magnetic circuit, of the current transformer winding 85. As a result of this construction, external faults are prevented from following a breakdown path to ground disposed internally of the magnetic circuit of current transformer winding 85. Substantially all faults in the region of the current transformer winding 85 will be to the shield 93 rather than to the winding 85 or to the conductive parts 39, 40 disposed internally of the winding, and such faults will be directed to ground through the conductive straps 94 disposed externally to the current transformer winding 85 and its core 86, thus effectively bypassing the winding 85 and the core 86. As a result, only the one differential relay in whose operating zone the external fault occurs operates in response to such fault. Since the interrupting ability of the breaker A is unimpaired by such external fault, it is capable of isolating the fault from the circuit at the other side of the breaker, thereby allowing uninterrupted service to be maintained over such circuit at the other side of the breaker.

In the preceding paragraph and elsewhere in the present application, reference is made to the "breakdown path to ground" followed by fault current. It is to be understood that this term is used to denote not only the arcing path followed by the fault current but also the path followed by the fault current through normally grounded conductive structure.

Some circuit breaker users might wish to relay external faults in the immediate vicinity of the breaker in the same manner as internal faults, on the assumption that such faults could possibly impair the interrupting ability of the breaker. Such circuit breaker users can be accommodated by utilizing an arrangement of the type shown in Fig. 3. The apparatus of Fig. 3 corresponds to that of Fig. 2 except for the fact that the shield 93 instead of being connected to ground only by structure disposed externally to the current transformer winding 85 is connected to ground only by structure disposed internally to this current transformer winding 85. In this latter regard, the shielding ring 93 is supported on the annular member 40 by conductive straps 95 located above the current transformer winding 85. No electrical connection between the tank 38 and the ring 93 is provided externally to the current transformer winding 85. As a result, any faults to the shielding ring 93 would be forced to follow a breakdown path to ground encompassed by the winding 85, i.e., via the straps 94 and the throat 39 of tank 38.

There are numerous advantages derived from locating the current transformer winding 85 externally to the enclosure 22 and in its particular location of Figs. 2 and 3 externally to the enclosure 22. First of all, no high voltage insulation is required for this winding since it is disposed externally to the throat 39 of the grounded tank 38. As a result, substantially the entire line voltage is applied between the throat 39 and the primary winding 50, 51, 52, and substantially no voltage is applied between the grounded current transformer winding 85 and the parts immediately adjacent thereto. Since the insulation between the throat 39 and the primary windings 51, 52, 50 is required whether the winding 85 is present or not, it will be apparent that the presence of the winding necessitates no additional insulation. The fact that no additional insulation is required is an important one from an economics viewpoint.

Another important advantage derived from the external location of the current transformer winding 85 is that this location assures that faults internal to the current transformer assembly will be directed to ground via a path encompassed by the magnetic circuit of the current transformer winding 85 rather than by one bypassing the magnetic circuit of the winding 85.

Another advantage derived from the particular location of the current transformer winding 85 is that when the shielding ring 93 is connected as shown in Fig. 2, the winding can distinguish between faults internal to the tank 38 and faults external to the tank 38. The ability to make this distinction is of course basic to the operation of the arrangement shown in Fig. 2.

Another advantage derived from the particular location of the current transformer winding 85 is that the winding cannot be readily energized or deenergized erroneously, or inadvertently. For example, there is little likelihood that a careless workman will make any electrical connection from the tank to ground that would bypass the magnetic circuit of the current transformer winding 85 or in any other way erroneously effect its operation. For example, it sometimes happens that an extra ground connection is erroneously or carelessly inserted between a tank (such as 38) and ground. Because the location of the current transformer winding is at the top of the tank, it is highly unlikely that the workman would choose for his extra ground connection a location bypassing the current transformer winding, i.e., a location above the current transformer winding 85. In a location chosen below that of the current transformer winding, the extra ground connection would not impair the desired operating ability of the current transformer winding 85. As another example, workmen have been known to carelessly ground other apparatus, such as welding sets, through tanks such as 38. Ground current from such apparatus flowing internally to the core of the current transformer winding could produce erroneous opening of all the circuit breakers A, B, and C. With the disclosed apparatus, however, any such connection would almost assuredly be below the location of the current transformer winding and current flowing to ground through such connection would not energize the current transformer winding 85.

To prevent electrical stresses from being concentrated adjacent the outer edges of the metallic plate 57, which extends across the insulating column 35 at the terminals of the current transformer, an electrostatic shield 96 has been provided. This shield 96, being of a generally annular configuration, extends about the column 35, thus generally enclosing all of the relatively sharp metallic edges in this region. The shield is of conductive material and has a relatively smooth external surface, devoid of sharp corners and blending smoothly into the external surface of tube 56. The shield 96 is electrically connected to the tube 56 and the line terminal structure 53, 57 of the current transformer primary but is locally insulated from the other terminal structure 54, 58 of the current transformer primary. In other words, the only connection between the shield 96 and said other terminal structure 54, 58 is through the primary 51, 52, 50 of the current transformer. As a result, any fault occurring from the shield 96 externally to the column 35 will be relayed in the same manner as a fault occurring from the tube 56.

The electrostatic shield 96 serves the additional important purpose of minimizing the possibility of external breakdowns between the metallic housing 23 of the interrupter and ground. In this regard, the shield 96 is physically positioned between the housing 23 and ground and is at substantially the same potential as the housing 23 when the circuit breaker is closed. As a result, any fault to ground from the metallic structure 23, 96 is much more likely to occur from the shield 96 than from the housing 23. This is highly desirable because it is easier to relay correctly a fault to ground from the shield 96 than one from the housing 23. In this regard, a fault from the shield 96 will be relayed as an external fault which, in fact, it is. A fault from the housing 23 to ground would be relayed in the same manner, but this would not generally be a correct interpretation of such fault since such fault is, in effect, a fault in the internal circuit of the breaker, i.e., from the portion of the circuit extending between the contacts 24, 25.

Up to this point, my invention has been described only in connection with a circuit breaker assembly that has one supporting column. It is to be understood, however, that it is also applicable to circuit breakers having more than one supporting column, as is illustrated, for example, in Fig. 4. In this Fig. 4, an assembly corresponding to that depicted at A in Fig. 2 is connected in series with a second interrupter 100 identical to the interrupter 20 of Fig. 2. This second interrupter comprises a metallic housing 101 in which are mounted interrupting contacts 103 which are operable simultaneously with the contacts of the interrupter 20 (by suitable means, not shown). This second interrupter is supported on a hollow vertical insulating column 102 which isolates the high voltage parts of the second interrupter 100 from ground. These high voltage parts are all disposed atop the second column 102, and none is mounted within the insulating column, as in Fig. 2. The second column 102 is mounted on a short metallic column 105 which is suitably secured to a grounded metallic framework 107.

Disposed about the short metallic column 105 immediately adjacent the bottom of the insulating column 102 is a grounding current transformer winding 110, which has its core, or magnetic circuit, also disposed about the column 105. Shielding structure in the form of a grading ring 114 is electrically interposed between the high voltage parts of the interrupter 100, on one hand, and the winding 110 and the metallic column 105 on the other hand. Preferably, this shielding structure is electrically connected to ground solely by means of conducting structure disposed externally to the magnetic circuit of the grounding current transformer winding 110. This conducting structure is in the form of rigid straps 116 secured between the grading ring 114 and the framework 107 externally to the winding 110.

The purpose of the winding 110 is to detect possible faults occurring from the high voltage parts of the interrupter 100 to ground inside the hollow insulating column 102. Such faults would be likely to impair the interrupting ability of the breaker and should be relayed in the same manner as previously described relative to faults occurring inside the other column 35, i.e., by opening the breakers on both electrical sides of the faulted breaker. To this end, the winding 110 provided for the column 102 is preferably connected in parallel with the winding 85 of the other column so that energization of either of these windings 85 or 110 causes the relay 90 of Fig. 1 to operate.

The purpose of the shielding structure 114, 116 is to cause faults to ground occurring in the immediate vicinity of column 102 to be relayed differently from faults occurring internally to the column 102 and, specifically, to be relayed as external faults requiring opening only of the depicted circuit breaker of Fig. 4 and breakers (such as C in Fig. 1) disposed electrically to the right of the depicted breaker. To this latter end, the grading ring 114 is so disposed that all faults to ground occurring in the immediate vicinity of the column 102 will always be to the grading ring 114. Accordingly, all such faults will be conducted to ground via a breakdown path effectively by-passing the magnetic circuit of winding 110, thereby allow such faults to go undetected by winding 110. Referring to Fig. 1, the fault in question is located solely in the operating zone of the right hand differential relay 71 inasmuch as it is located electrically between the windings 61 and 83 and not between the windings 60 and 81. As a result, only the depicted breaker and the breaker C to the right of the depicted breaker would be opened in response to this fault, as is desired.

As was previously explained in connection with Fig. 3, some circuit breaker users might wish to relay a fault external to a supporting column in the immediate vicinity of the supporting column as a fault requiring opening of the breakers (B and C) on both sides of the faulted breaker. To accommodate such users, the grading rings 114 of Fig. 4 can alternatively be connected in substantially the same manner as the grading ring of Fig. 3. As a result, faults occurring to the grading ring 114 would energize the winding 110 and cause operation of the relay 90, thereby effecting opening of breakers B and C as well as the faulted breaker. If the grading ring 114 is connected in this manner, the grading ring 93 of Fig. 4 would ordinarily be connected as shown in Fig. 3.

For higher voltage applications, the circuit breaker assembly can be made up of even more than the two interrupters shown in Fig. 4. For example, three or even four column-supported interrupters all connected in series can be utilized. For such assemblies, a suitably-shielded grounding current transformer winding corresponding to 110 of Fig. 5 can be disposed about the base of each insulating column. My studies of such assemblies indicate, however, that satisfactory protection is obtained if only the outer two columns are provided with grounding current transformer windings inasmuch as the inner columns are much less susceptible to breakdown than the outer columns.

Although most circuit breaker users will wish to open all of the circuit breakers A, B, and C in response to energization of one of the grounding current transformer secondary windings mounted about a supporting column, a few users might be satisfied under such conditions merely to open the faulted breaker and only the breaker on the particular side of the contacts of the faulted breaker where the fault is located. For example, in the arrangement of Figs. 1 and 2, such a user would be satisfied to open only the breakers A and B in response to a fault in the enclosure 22. To accommodate this particular user, the winding 85 would be connected merely to trip breakers A and B in response to its energization. In other words, the relay 90 which is controlled by the coil 85, would close a trip circuit only for breakers A and B when picked-up in response to energization of winding 85.

Although my invention is especially applicable to protective arrangements in which the windings 60 and 61 are connected in differential type protective circuits, it is to be understood that the invention in its broader aspects is applicable to arrangements in which such windings are connected in other types of protective circuits, e.g., to energize impedance type protective relays.

To facilitate an understanding of my invention I have, in the above description, dealt with only a single phase of the power system. It is to be understood, however, that my invention will normally be used in a polyphase system and, thus, circuit breaker assemblies corresponding to the assembly A will be located adjacent the assembly A and will be similarly connected in the other phases of the power system. These assemblies should be sufficiently spaced from each other to minimize the possibility that any fault that does occur will be from phase-to-phase. In other words, the insulation coordination is such that a higher voltage is required for a phase-to-phase flashover than for a phase-to-ground flashover.

While I have shown and described particular embodiments of my invention, it will be obvious to those skilled in the art that various changes and modifications may be made without departing from my invention in its broader aspects and I, therefore, intend in the appended claims to cover all such changes and modifications as fall within the true spirit and scope of my invention.

What I claim as new and desire to secure by Letters Patent of the United States is:

1. In a circuit breaker assembly for interconnecting power circuits disposed at opposite electrical sides thereof, a circuit interrupter comprising a housing and separable contacts disposed within said housing, an enclosure comprising a hollow insulating column and a tank disposed adjacent the lower end of the column, means for supporting said housing on said column, a current transformer primary conductor connected in series with said contacts and comprising a pair of series-connected arms forming a loop, one of said arms extending through a portion of said column into said tank and the other of said arms extending from said tank back through a portion of said column, first and second current transformer secondary windings disposed within said tank and magnetically coupled to said primary conductor, one of said secondary windings defining one of the boundaries of a differential protective zone located at one electrical side of said circuit breaker and the other of said secondary windings defining one of the boundaries of another differential protective zone located at the other electrical side of said circuit breaker, a third current transformer secondary winding disposed externally to said enclosure and having a magnetic circuit also disposed externally to said enclosure and mounted about both arms of said primary conductor so that said third winding is normally deenergized, means responsive to energization of said third secondary winding for initiating deenergization of the power circuits at both electrical sides of said circuit breaker assembly, means for forcing substantially all faults occurring within said enclosure to follow a path to ground so located that the fault produces a net flow of current in the region disposed internally of the magnetic circuit of said third winding, and means for forcing substantially all ground faults external to said circuit breaker assembly to follow a breakdown path to ground which is located externally to the magnetic circuit of said third winding.

2. The circuit breaker assembly of claim 1 in which said insulating column and said tank are joined together in a predetermined region, said third winding being disposed about said enclosure in said predetermined region.

3. The circuit breaker assembly of claim 1 in which said last-mentioned means comprises conductive shielding for said third winding electrically connected to ground only by connecting means disposed externally to the magnetic circuit of said third winding, said shielding being electrically interposed between the combination of said third winding and all grounded structure encompassed by said magnetic circuit, on one hand, and the points on said circuit breaker assembly which are susceptible to external faults, on the other hand.

4. In a circuit breaker assembly for interconnecting power circuits disposed at opposite electrical sides thereof, a circuit interrupter comprising a housing and separable contacts disposed within said housing, an enclosure comprising a hollow insulating column and a tank disposed adjacent the lower end of the column, means for supporting said housing on said column, a current transformer primary conductor connected in series with said contacts and comprising a pair of series-connected arms forming a loop, one of said arms extending through a portion of said column into said tank and the other of said arms extending from said tank back through a portion of said column, first and second current transformer secondary windings disposed within said tank and magnetically coupled to said primary conductor, one of said secondary windings defining one of the boundaries of a differential protective zone located at one electrical side of said circuit breaker and the other of said secondary windings defining one of the boundaries of another differential protective zone located at the other electrical side of said circuit breaker, a third current transformer secondary winding disposed externally to said enclosure and having a magnetic circuit also disposed externally to said enclosure and mounted about both arms of said primary conductor so that said third winding is normally deenergized, means responsive to energization said third secondary winding for initiating deenergization of the power circuits at both electrical sides of said circuit breaker assembly, means for forcing substantially all faults occurring within said enclosure to follow a path to ground so located that the fault produces a net flow of current in the region disposed internally of the magnetic circuit of said third winding, and means for forcing all ground faults occurring externally to said circuit breaker assembly in the region of said insulating column consistently to follow a breakdown path to ground which has a predetermined electrical location relative to the magnetic circuit of said third winding.

5. The circuit breaker assembly of claim 4 in which said insulating column and said tank are joined together in a predetermined region, said third winding being disposed about said enclosure in said predetermined region.

6. In a circuit breaker assembly for interconnecting power circuits disposed at opposite electrical sides thereof, a circuit interrupter comprising a housing and separable contacts disposed within said housing, an enclosure comprising a hollow insulating column and a tank disposed adjacent the lower end of the column, means for supporting said housing on said column, a current transformer primary conductor connected in series with said contacts and comprising a pair of series-connected arms forming a loop, one of said arms extending through a portion of said column into said tank and the other of said arms extending from said tank back through a portion of said column, first and second current transformer secondary windings disposed within said tank and magnetically coupled to said primary conductor, one of said secondary windings defining one of the boundaries of a differential protective zone located at one electrical side of said circuit breaker and the other of said secondary windings defining one of the boundaries of another differential protective zone located at the other electrical side of said circuit breaker, a third current transformer secondary winding disposed externally to said enclosure and having a magnetic circuit also disposed externally to said enclosure and mounted about both arms of said primary conductor so that said third winding is normally deenergized, means responsive to energization of said third secondary winding for initiating deenergization of the power circuits at both electrical sides of said circuit breaker assembly, means for forcing substantially all faults occurring within said enclosure to follow a path to ground so located that the fault produces a net flow of current in the region disposed internally of the magnetic circuit of said third winding, and means for forcing all ground faults occurring externally to said circuit breaker assembly in the region of said insulating column consistently to follow a breakdown path to ground which is located internally of the magnetic circuit of said third winding.

7. The assembly of claim 6 in which said insulating column and said tank are joined together in a predetermined region and in which said third winding is located in said predetermined region.

8. The circuit breaker assembly of claim 6 in which said last-mentioned means comprises conductive shielding for said third winding electrically connected to ground only by connecting means disposed internally of the magnetic circuit of said third winding, said shielding being electrically interposed between said third winding and the points on said circuit breaker assembly which are susceptible to external faults.

9. A circuit breaker assembly comprising a circuit interrupter and a current transformer assembly disposed at one electrical side thereof, said circuit interrupter comprising a housing including a tubular portion of insulating material, a pair of separable contacts within said housing, a pair of circuit interrupter terminals at spaced apart points on said housing, conductive means interconnecting said contacts with said terminals and surrounded by said tubular insulting portion in the region of one of said circuit interrupter terminals, said current transformer assembly comprising an insulating enclosure, a pair of current transformer terminals, and a primary circuit extending between said terminals internally to said enclosure, a length of conductor disposed externally to said housing and said enclosure and connecting one of said current transformer terminals to said one circuit interrupter terminal, tubular conductive structure surrounding said length of conductor and generally enclosing the connection between said length of conductor and said one circuit interrupter terminal, means for connecting said tubular conductive structure to the other of said current transformer terminals at one end thereof and for connecting said tubular structure to a power line at a point spaced from said one end, the sole electrical connection between said length of conductor and said tubular conductive structure being through said primary circuit.

10. In the circuit breaker assembly of claim 9, at least one current transformer secondary winding magnetically coupled to said primary conductor and located within said enclosure, said winding defining one of the boundaries of a differential protective zone in which said tubular conductive structure is located, said length of conductor being located at least partially outside of said differential protective zone.

11. The current transformer assembly of claim 9 in which said primary conductor is of a loop-shaped configuration and comprises a pair of series-connected conductive arms disposed within said enclosure, one of said arms being of a tubular form and the other of said arms being disposed within said one tubular arm, means for electrically connecting said tubular arm to said tubular conductive structure and for connecting said other arm to said length of conductor disposed within said tubular conductive structure, said tubular arm being located electrically between said other arm and said tubular conductive structure.

12. In the circuit breaker assembly of claim 11, at least one current transformer secondary winding magnetically coupled to said primary conductor and located within said enclosure, said winding defining one of the boundaries of a differential protective zone in which said tubular conductive structure and said tubular arm are located, at least a part of said other arm and said length of conductor being outside of said differential protective zone.

13. The circuit breaker assembly of claim 1 in which the connection between said contacts and said current transformer primary circuit comprises a length of conductor disposed externally to said housing and said enclosure and connected to one arm of said primary conductor, tubular conductive structure surrounding said length of conductor and generally enclosing said length of conductor in the region where the conductor enters said housing, means for electrically connecting said tubular conductive structure to the other arm of said current transformer primary conductor adjacent one end of said tubular conductive structure and for connecting said tubular conductive structure to a power line at a point spaced from said one end, the sole electrical connection between said tubular conductive structure and said length of conductor being through said primary conductor.

14. The circuit breaker assembly of claim 13 in combination with an annular shield encompassing said insulating column at a point located between the grounded parts of said assembly and the parts of said interrupter housing which are susceptible to breakdowns externally of said column, said shield being electrically connected to said primary conductor at the power line side only of said primary conductor.

15. In a circuit breaker assembly for interconnecting power circuits disposed at opposite electrical sides thereof, a circuit interrupter comprising a housing and separable contacts disposed within said housing, an enclosure comprising a hollow insulating column and a tank disposed adjacent the lower end of the column, means for supporting said housing on said column, a current transformer primary conductor connected in series with said contacts and comprising a pair of series-connected arms forming a loop, one of said arms extending through a portion of said column into said tank and the other of said arms extending from said tank back through a portion of said column, means including a current transformer secondary winding disposed within said tank and magnetically coupled to said primary conductor for providing fault protection for at least one of said power circuits, an additional current transformer secondary winding disposed externally to said enclosure and having a magnetic circuit also disposed externally to said enclosure and mounted about both arms of said primary conductor so that said additional winding is normally deenergized, means responsive to energization of said additional secondary winding for initiating deenergization of at least the power circuit disposed at the current-transformer side of said contacts, means for forcing substantially all faults occurring within said enclosure to follow a path to ground so located that the fault produces a net flow of current in the region disposed internally of the magnetic circuit of said additional winding, and means for forcing substantially all ground faults occurring externally to said circuit breaker assembly to follow a breakdown path to ground which is located externally to the magnetic circuit of said additional winding.

16. The circuit breaker assembly of claim 15 in which the means responsive to energization of said additional winding is arranged to initiate deenergization of the power circuits at both electrical sides of the circuit breaker assembly upon energization of said third winding.

17. The circuit breaker assembly of claim 15 in which said insulating column and said tank are joined together in a predetermined region, said additional winding being disposed about said enclosure in said predetermined region.

18. The circuit breaker assembly of claim 17 in which the means responsive to energization of said additional winding is arranged to initiate deenergization of the power circuits at both electrical sides of circuit breaker assembly upon energization of said third winding.

19. In a circuit breaker assembly for interconnecting power circuits disposed at opposite electrical sides thereof, a circuit interrupter comprising a housing and separable contacts disposed within said housing, an enclosure compring a hollow insulating column and a tank disposed adjacent the lower end of the column, means for supporting said housing on said column, a current transformer primary conductor connected in series with said contacts and comprising a pair of series-connected arms forming a loop, one of said arms extending through a portion of said column into said tank and the other of said arms extending from said tank back through a portion of said column, means including a current transformer secondary winding disposed within said tank and magnetically coupled to said primary conductor for providing fault protection for at least one of said power circuits, an additional current transformer secondary winding disposed externally to said enclosure and having a magnetic circuit also disposed externally to said enclosure and mounted about both arms of said primary conductor so that said additional winding is normally deenergized, means responsive to energization of said additional secondary winding for initiating deenergization of the power circuits at both electrical sides of said circuit breaker assembly, means for forcing substantially all faults occurring within said enclosure to follow a path to ground so located that the fault produces a net flow of current in the region disposed internally of the magnetic circuit of said additional winding, and means for forcing all ground faults occurring externally to said circuit breaker assembly in the region of said insulating column consistently to follow a breakdown path to ground which is located internally of the magnetic circuit of said additional winding.

20. The circuit breaker assembly of claim 15 in which said assembly further comprises a second interrupter having separable contacts connected in series with the contacts of said first interrupter and operable substantially simultaneously with the contacts of said first interrupter, a second hollow insulating column supporting said second interrupter, a current transformer winding having a magnetic circuit located near the lower end of said second hollow column and encircling substantially all breakdown paths to ground extending internally of said hollow second column, and means for forcing substantially all external flashovers in the immediate region of said second column to follow a breakdown path to ground which is located externally to the magnetic circuit of said latter current transformer winding.

21. The circuit breaker assembly of claim 19 in which said assembly further comprises a second interrupter having separable contacts connected in series with the contacts of said first interrupter and operable substantially simultaneously with the contacts of said first interrupter, a second hollow insulating column supporting said second interrupter, a current transformer winding having a magnetic circuit located near the lower end of said second hollow column and encircling substantially all breakdown paths to ground extending internally of said second hollow column, and means for forcing all ground faults occurring externally of said circuit breaker assembly in the region of said second insulating column consistently to follow a breakdown path to ground which is located internally of the magnetic circuit of said latter winding.

References Cited in the file of this patent

UNITED STATES PATENTS

| | | |
|---|---|---|
| 2,804,576 | Coggeshall et al. | Aug. 27, 1957 |
| 2,804,577 | Roth | Aug. 27, 1957 |